(12) United States Patent
Kanai

(10) Patent No.: US 8,646,360 B2
(45) Date of Patent: Feb. 11, 2014

(54) FLEXSPLINE AND WAVE GEAR DEVICE

(75) Inventor: Satoru Kanai, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 657 days.

(21) Appl. No.: 12/408,029

(22) Filed: Mar. 20, 2009

(65) Prior Publication Data

US 2009/0260469 A1    Oct. 22, 2009

(30) Foreign Application Priority Data

Apr. 18, 2008 (JP) ................................ 2008-108715

(51) Int. Cl.
*F16H 49/00* (2006.01)

(52) U.S. Cl.
USPC ........................................................ 74/640

(58) Field of Classification Search
USPC ........................................................ 74/640
See application file for complete search history.

(56) References Cited

U.S. PATENT DOCUMENTS

| | | | | |
|---|---|---|---|---|
| 3,996,816 A * | 12/1976 | Brighton | .......................... | 74/640 |
| 4,524,639 A * | 6/1985 | Carlson | ............................ | 74/640 |
| 4,784,015 A * | 11/1988 | Schumacher | ................... | 74/640 |
| 5,715,732 A * | 2/1998 | Takizawa et al. | ................ | 74/640 |
| 5,775,178 A * | 7/1998 | Asawa et al. | .................... | 74/640 |
| 5,918,508 A * | 7/1999 | Ishikawa | ......................... | 74/640 |
| 6,050,155 A * | 4/2000 | Tortora | ............................ | 74/640 |
| 6,182,532 B1 * | 2/2001 | Shirasawa | ....................... | 74/640 |

FOREIGN PATENT DOCUMENTS

| | | | |
|---|---|---|---|
| EP | 1128094 A1 * | 8/2001 | |
| JP | 2-275147 A | 11/1990 | |
| JP | 2000-186718 A | 7/2000 | |
| JP | 2007-231996 A | 9/2007 | |

\* cited by examiner

*Primary Examiner* — David D Le
*Assistant Examiner* — Terry Chau
(74) *Attorney, Agent, or Firm* — Buchanan Ingersoll & Rooney PC

(57) ABSTRACT

In a flexspline of a wave gear device, an annular flange thereof is constructed from a first annular part bent at a right angle from an outer peripheral edge of a diaphragm, and a second annular part caused to inwardly protrude at a uniform width from a leading end of the first annular part. It is possible for the annular flange to be disposed within the region where the diaphragm is formed, as viewed in the direction of an axis of the device. An outer diameter can be reduced to a greater extent than with a "silk hat"-shaped flexspline; and when a hollow wave gear device is manufactured, a hollow diameter can be more readily increased than in a case where a cup-shaped flexspline is used.

5 Claims, 5 Drawing Sheets

(FRONT VIEW)

(REAR VIEW)

(PLAN VIEW)

FLEXSPLINE AND WAVE GEAR DEVICE

TECHNICAL FIELD

The present invention relates to a flexspline that is a component of a wave gear device, and particularly relates to an improvement to a flexspline shape making it possible to reduce an outer diameter of a hollow wave gear device.

BACKGROUND ART

Wave gear devices are typically known to be of a cup type, which has a cup-shaped flexspline (see Patent Document 1); a "silk hat" type, which has a flexspline having a shape resembling a top hat (see Patent Document 2); and a flat type, which has a cylindrical flexspline (see Patent Document 3). In the cup type and the "silk hat" type, an attachment flange or boss is formed on the flexspline. The flange or boss is a rigid member and is shaped like a disc or a ring. A stationary-side member or a load-side member is securely coupled to the flange or boss.

When a cup type hollow wave gear device having a hollow part penetrating and extending through the center is used, the attachment flange, which defines the bottom surface portion of the cup shape of the flexspline, must have a hollow part formed therein; accordingly, a limitation is presented in that the hollow diameter cannot be increased. Conversely, when a "silk hat" type hollow wave gear device is used, there are no restrictions imposed by the attachment flange on the hollow diameter. However, since the attachment flange widens outward, the attachment flange portion has the largest outer diameter of the wave gear device, and the wave gear device inevitably has a larger outer diameter than does a cup type device.

[Patent Document 1] JP-A 2007-231996
[Patent Document 2] JP-A 2000-186718
[Patent Document 3] JP-A 02-275147

DISCLOSURE OF THE INVENTION

Problems the Invention is Intended to Solve

A flexspline suited to the manufacture of a hollow wave gear device allowing the hollow diameter to be increased and the outer diameter simultaneously reduced has thus not been provided in the prior art.

With the foregoing in view, it is an object of the present invention to provide a flexspline for a wave gear device, wherein the hollow diameter can be increased without increasing the outer diameter.

It is a further object of the present invention to provide a wave gear device using this novel flexspline.

Means for Solving the Problems

In order to solve the abovementioned problems, according to the present invention there is provided a flexspline (3) that is a structural component of a wave gear device (1), the flexspline (3) of the wave gear device (1) characterized in comprising a radially flexible cylindrical body (31); a disc-shaped diaphragm (32) continuous with one open end (31a) of the cylindrical body (31), the disc-shaped diaphragm (32) bending and extending outward in a radial direction; a rigid, annular flange (33) continuous with an outer peripheral edge (32a) of the diaphragm (32); and external teeth (34) formed on an outer peripheral surface portion of the cylindrical body (31) on another open end (31b) thereof; wherein the annular flange (33) has a first annular part (33a) extending from the outer peripheral edge (32a) of the diaphragm (32) and bending at a right angle in a direction away from the cylindrical body (31), and a second annular part (33b) that is a region on a leading end of the first annular part (33a) caused to inwardly protrude a fixed amount at a uniform width.

It is desirable that the annular flange (33), when viewed in a direction of an axis (1a) of the device, be located within a region where the diaphragm (32) is formed.

According to another aspect, a wave gear device (1) is characterized in comprising a rigid circular spline (2), the abovementioned structural flexspline (3), and a wave generator (4) for bending the flexspline (3) into an elliptical shape, causing enmeshment with the circular spline (2) at either end portion along a major axis of the ellipse, and causing the meshing locations to move in a circumferential direction, whereby both splines (2, 3) rotate in a correlating manner in accordance with a difference in number of teeth therebetween.

When the wave gear device is a hollow wave gear device, a through-hole (43) may be formed in a center portion of the wave plug (41) of the wave generator (4).

The reference numerals enclosed in parentheses are used in the embodiments of the present invention described hereinbelow, and are intended to facilitate comprehension, but shall not be construed as limiting the present invention to the embodiments described.

Effect of the Invention

In the flexspline of the present invention, the annular flange is constructed from a first annular part bent at a right angle from the outer peripheral edge of the diaphragm, and a second annular part caused to inwardly protrude at a uniform width from a leading end of the first annular part; and it is possible for the annular flange to be disposed within the region where the diaphragm is formed, as viewed in the direction of the axis of the device.

Therefore, according to the present invention, the outer diameter can be reduced to a greater extent than with a "silk hat"-shaped flexspline. Moreover, when a hollow wave gear device is manufactured, the hollow diameter can be more readily increased than in a case where a cup-shaped flexspline is used.

Accordingly, in a hollow wave gear device in which the flexspline of the present invention is used, a large hollow diameter can be formed without a substantial increase in the outer diameter.

KEY

Figure 1:
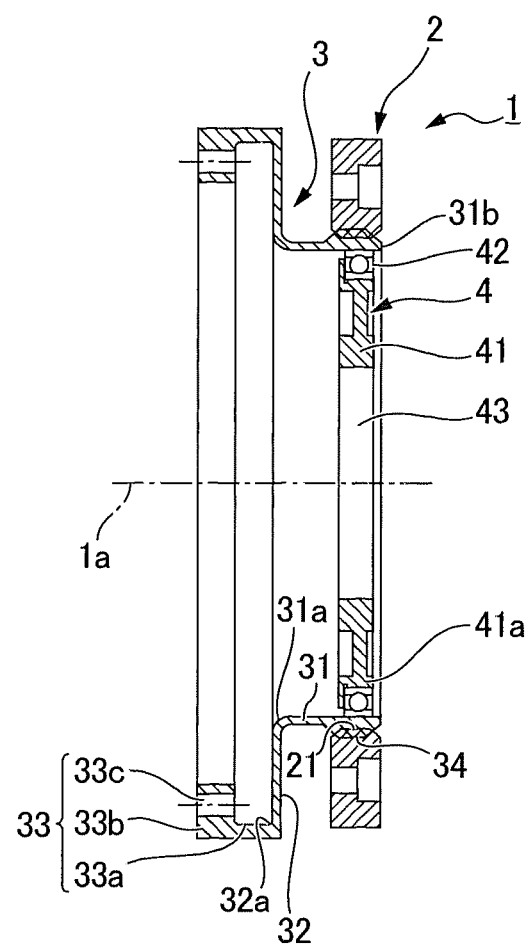
FIG. 1 is a longitudinal cross-sectional view of a hollow wave gear device to which the present invention is applied.

1 Wave gear device
2 Circular spline
21 Internal teeth

3 Flexspline
31 Cylindrical body
31a Open end
31b Open end
32 Diaphragm
32a Outer peripheral edge
33 Annular flange
33a First annular part
33b Second annular part
33c Threaded hole
4 Wave generator
41 Wave plug
41a Outer peripheral surface
42 Wave bearing
43 Through-hole

BEST MODE FOR CARRYING OUT THE INVENTION

Embodiments of a flexspline and wave gear device to which the present invention is applied are described below with reference to the accompanying drawings FIG. 1 is a longitudinal cross-section showing one example of a hollow wave gear device to which the present invention is applied A wave gear device 1 comprises a rigid circular spline 2; a flexspline 3; and an elliptical, hollow wave generator 4.

Internal teeth 21 are formed on an inner peripheral surface of the circular spline 2. The flexspline 3 is disposed inside the circular spline 2 in a coaxial state, the flexspline 3 comprising a radially flexible cylindrical body 31; a disc-shaped diaphragm 32 continuous with one open end 31a of the cylindrical body 31, the diaphragm 32 bending and extending outward in a radial direction; a rigid, annular flange 33 continuous with an outer peripheral edge 32a of the diaphragm 32; and external teeth 34 formed on an outer peripheral surface portion of the cylindrical body 31 on the other open end 31b thereof. The external teeth 34 are capable of meshing with the internal teeth 21.

The wave generator 4 comprises a wave plug 41 made of a rigid member having an elliptical outer peripheral surface 41a, and a wave bearing 42 fitted into the elliptical outer peripheral surface 41a of the wave plug 41. The wave plug 41 is of hollow construction, and has a through-hole 43 in a center portion. The wave bearing 42 comprises radially flexible outer and inner races.

Figure 2:
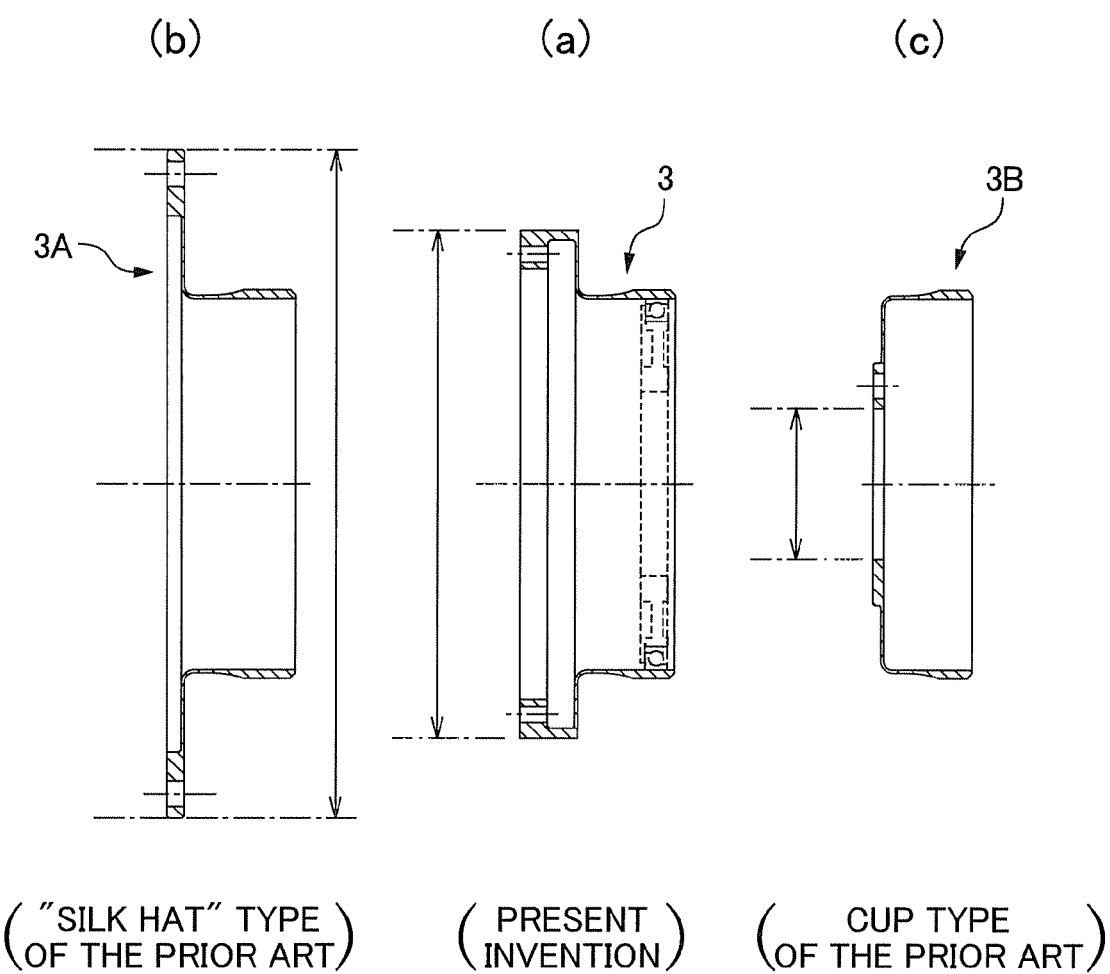
FIG. 2 is (a) a longitudinal cross-sectional view showing the flexspline of FIG. 1, (b) a longitudinal cross-section showing a conventional "silk hat"-shaped flexspline, and (c) a longitudinal cross-section showing a conventional cup-shaped flexspline.
Figure 3:
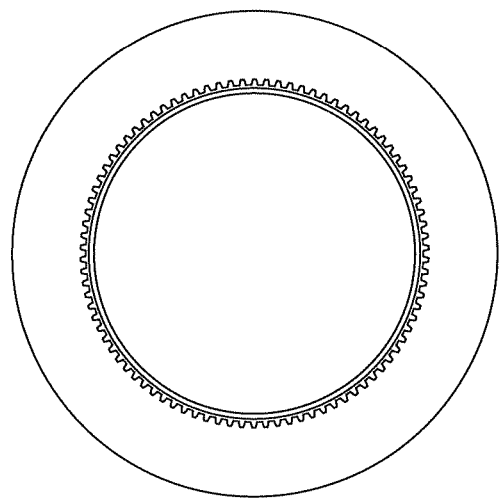
FIG. 3 is a front view of the flexspline of FIG. 1.
Figure 4:
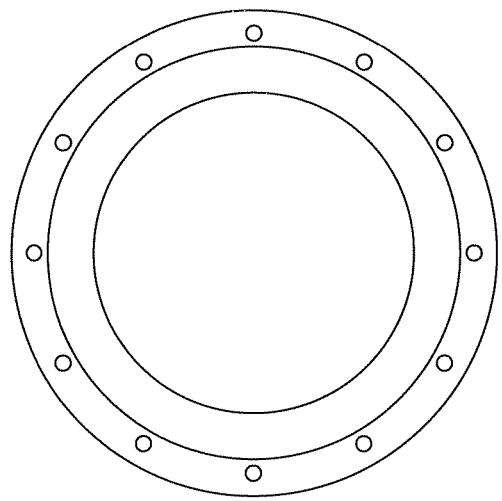
FIG. 4 is a rear view of the flexspline of FIG. 1.
Figure 5:
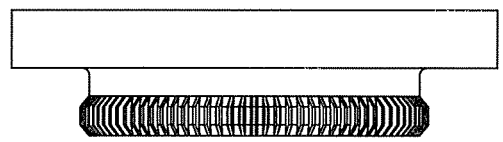
FIG. 5 is a plan view of the flexspline of FIG. 1.

FIG. 2(a) is a longitudinal cross-sectional view of the flexspline 3, while FIGS. 3, 4, and 5 show front, rear, and plan views, respectively, of the flexspline 3. As illustrated in these drawings, the shape of the annular flange 33 of the flexspline 3 is derived from a first annular part 33a extending from the outer peripheral edge 32a of the diaphragm 32 and bent at a right angle in the direction away from the cylindrical body 31, and a second annular part 33b that is a region on a leading end of the first annular part 33a caused to inwardly protrude a fixed amount at a uniform width, the second annular part 33b having a rectangular shape in cross-section. The radial width of the second annular part 33b is substantially half that of the diaphragm 32, and attachment threaded holes 33c are formed at equiangular intervals along the circumference of the second annular part 33b. Accordingly, when viewed in the direction of an axis 1a of the device, the annular flange 33 is located within the region where the diaphragm 32 is formed.

In the hollow wave gear device 1 of the above construction, the wave generator 4 is fitted within the portion of the flexspline 3 where the exterior teeth 34 are formed, and the portion where the exterior teeth 34 are formed bends into an elliptical shape. As a result, the external teeth 34 on either end portion of the major axis of the ellipse mesh with the internal teeth 21 of the rigid circular spline 2. When the wave generator 4 rotates, the positions at which both splines 2, 3 mesh move in a circumferential direction, and the two splines 2, 3 rotate in a correlating manner in accordance with the difference in the number of teeth therebetween. The difference in the number of teeth is typically 2n (where n is a positive integer), and generally the flexspline 3 has two fewer teeth. The circular spline 2 is securely fastened to a stationary-side member, the annular flange 33 of the flexspline 3 is coupled to a load-side member, and the load-side member is rotatably driven at a reduced rate of rotation derived from the flexspline 3.

In the hollow wave gear device 1 of the present example, the shape of the annular flange 33 of the flexspline 3 is derived from a first annular part 33a extending from the outer peripheral edge 32a of the diaphragm 32 and bending in the direction of the axis 1a of the device, and a second annular part 33b that is an inwardly thickened part of the leading end of the first annular part 33a.

As shown in FIG. 2, an outer diameter of the flexspline of the present invention can be made smaller than that of a conventional "silk hat"-shaped flexspline 3A (see FIG. 2(b)). Moreover, the hollow diameter will not be restricted by the annular flange, as in a conventional cup-shaped flexspline 3B (see FIG. 2(c)), and the hollow diameter can be made the same size as in a conventional "silk hat"-shaped flexspline. Therefore, a large-hollow-diameter wave gear device can be obtained with minimal increase in the outer diameter.

The invention claimed is:

1. A flexspline that is a structural component of a wave gear device, the flexspline of the wave gear device comprising:
   a radially flexible cylindrical body extending in an axial direction;
   a disc-shaped diaphragm continuous with one open end of the cylindrical body, the disc-shaped diaphragm extending outward in a radial direction that is substantially perpendicular to the axial direction, wherein the diaphragm has a first length in the radial direction;
   a rigid, annular flange continuous with an outer peripheral edge of the diaphragm; and
   external teeth formed on an outer peripheral surface portion of the cylindrical body on another open end thereof;
   wherein the annular flange has a first annular part extending in the axial direction from the outer peripheral edge of the diaphragm in a direction away from the cylindrical body, and a second annular part at a leading end of the first annular part which protrudes inwardly in a radial direction and having a second length in the radial direction, wherein the second annular part has a uniform thickness as measured in the axial direction, and the uniform thickness of the second annular part is greater than a thickness of the disc-shaped diaphragm as measured in the axial direction;
   wherein the first length of the diaphragm in the radial direction is greater than the second length of the second annular part in the radial direction; and
   the second annular part is parallel to and separate from the disc-shaped diaphragm so as to form a gap between the second annular part and the disc-shaped diaphragm.

2. The flexspline of the wave gear device of claim 1, wherein the annular flange, when viewed in the axial direction of the device, is located within a region where the diaphragm is formed.

3. A wave gear device, comprising:
   a rigid circular spline,
   the flexspline of claim 1, and a wave generator for bending the flexspline into an elliptical shape, causing enmeshment with the circular spline at either end portion along a major axis of the ellipse, and causing the meshing locations to move in a circumferential direction, whereby both splines rotate in a correlating manner in accordance with a difference in number of teeth therebetween.

4. The wave gear device of claim 3, wherein the wave generator comprises a wave plug made of a rigid member having an elliptical outline, and a wave bearing fitted into the elliptical outer peripheral surface of the wave plug; wherein the wave plug is a hollow wave plug having a through-hole in a center portion.

5. A wave gear device, comprising:

a rigid circular spline, the flexspline of claim 2, and a wave generator for bending the flexspline into an elliptical shape, causing enmeshment with the circular spline at either end portion along a major axis of the ellipse, and causing the meshing locations to move in a circumferential direction, whereby both splines rotate in a correlating manner in accordance with a difference in number of teeth therebetween.

\* \* \* \* \*